US009426306B2

(12) United States Patent  
Gemayel et al.

(10) Patent No.: US 9,426,306 B2  
(45) Date of Patent: Aug. 23, 2016

(54) SYSTEMS AND METHOD FOR DETERMINING A RELATIONSHIP RANK

(75) Inventors: Ziad Gemayel, New York, NY (US); Debra Servidio, New York, NY (US); Sam Smiljanic, New York, NY (US)

(73) Assignee: Morgan Stanley, New York, NY (US)

(*) Notice: Subject to any disclaimer, the term of this patent is extended or adjusted under 35 U.S.C. 154(b) by 1418 days.

(21) Appl. No.: 12/466,990

(22) Filed: May 15, 2009

(65) Prior Publication Data

US 2010/0290603 A1    Nov. 18, 2010

(51) Int. Cl.
```
H04M 11/00     (2006.01)
H04M 15/00     (2006.01)
G06F 17/30     (2006.01)
G06Q 30/02     (2012.01)
H04L 12/58     (2006.01)
H04M 1/64      (2006.01)
```

(52) U.S. Cl.  
CPC .......... *H04M 15/58* (2013.01); *G06F 17/3053* (2013.01); *G06Q 30/02* (2013.01); *H04L 12/5885* (2013.01); *H04L 51/34* (2013.01); *H04M 2215/0188* (2013.01)

(58) Field of Classification Search  
CPC .................. G06Q 10/107; H04M 1/72555  
USPC ............ 709/204, 206; 379/265.05, 265.07, 379/265.08, 88.17, 67.1, 93.25  
See application file for complete search history.

(56) References Cited

U.S. PATENT DOCUMENTS

| | | | |
|---|---|---|---|
| 7,302,429 B1 | 11/2007 | Wanker | |
| 8,175,249 B2* | 5/2012 | Elsey et al. | 379/218.02 |
| 8,224,912 B2* | 7/2012 | Sood | 709/206 |
| 8,285,795 B2* | 10/2012 | O'Sullivan et al. | 709/206 |
| 8,346,875 B2* | 1/2013 | Gillai et al. | 709/206 |
| 8,443,049 B1* | 5/2013 | Geddes | 709/207 |
| 8,478,826 B2* | 7/2013 | Erhart et al. | 709/206 |
| 2003/0028464 A1 | 2/2003 | Kosinski | |
| 2003/0187813 A1 | 10/2003 | Goldman et al. | |
| 2005/0055266 A1 | 3/2005 | Foth et al. | |
| 2005/0144162 A1* | 6/2005 | Liang | 707/3 |
| 2005/0154723 A1* | 7/2005 | Liang | 707/3 |
| 2005/0160107 A1* | 7/2005 | Liang | 707/100 |

(Continued)

OTHER PUBLICATIONS

International Search Report from International Application No. PCT/US2010/034945 dated May 14, 2010, 2 pages.

(Continued)

*Primary Examiner* — Solomon Bezuayehu  
(74) *Attorney, Agent, or Firm* — K&L Gates LLP

(57) ABSTRACT

A method of determining and an apparatus for displaying, for an organization, a relationship rank between a first party and a second party. A customer relationship management score, a telephone call score, and an e-mail score for the first party relative to the second party may be calculated using a computer system. The customer relationship management score, the telephone call score, and the e-mail score may be calculated using data for the first party and the second party stored in databases. A relationship score for the first party relative to the second party may be calculated using the customer relationship management score, the telephone call score, and the e-mail score. A relationship rank may be calculated for the first party relative to the second party using a computer system. The relationship rank for the first party relative to the second party may be an indication of the strength of the first party's relationship to the second party. The relationship rank may be based on the relationship score.

24 Claims, 6 Drawing Sheets

(56) References Cited

U.S. PATENT DOCUMENTS

| | | | |
|---|---|---|---|
| 2005/0203929 A1* | 9/2005 | Hazarika et al. | 707/100 |
| 2006/0041456 A1 | 2/2006 | Hurewitz | |
| 2006/0047566 A1 | 3/2006 | Fleming et al. | |
| 2006/0218111 A1* | 9/2006 | Cohen | 706/45 |
| 2006/0262922 A1 | 11/2006 | Margulies et al. | |
| 2007/0127694 A1 | 6/2007 | Hajj et al. | |
| 2008/0126951 A1* | 5/2008 | Sood et al. | 715/752 |
| 2009/0282104 A1* | 11/2009 | O'Sullivan | G06Q 10/107 709/204 |
| 2009/0313346 A1* | 12/2009 | Sood | 709/207 |
| 2010/0138298 A1* | 6/2010 | Fitzgerald | G06F 21/88 705/14.53 |
| 2010/0211644 A1* | 8/2010 | Lavoie et al. | 709/206 |
| 2011/0078259 A1* | 3/2011 | Rashad et al. | 709/206 |
| 2011/0173274 A1* | 7/2011 | Sood | 709/206 |
| 2011/0246584 A1* | 10/2011 | Vitaldevara et al. | 709/206 |
| 2011/0314098 A1* | 12/2011 | Farrell et al. | 709/204 |
| 2014/0172872 A1* | 6/2014 | Hyatt et al. | 707/741 |
| 2014/0229614 A1* | 8/2014 | Aggarwal | H04M 3/2227 709/224 |
| 2016/0100050 A1* | 4/2016 | VanBlon | H04M 3/42042 455/415 |

OTHER PUBLICATIONS

Written Opinion from International Application No. PCT/US2010/034945 dated May 14, 2010, 9 pages.

International Preliminary Report on Patentability, Nov. 24, 2011, PCT/US2010/034945.

* cited by examiner

SYSTEMS AND METHOD FOR DETERMINING A RELATIONSHIP RANK

BACKGROUND

In many industries, organizations employ a computer-based customer relationship management (CRM) system to track the organization's contacts with its customers. CRM systems store and track information on current and prospective customers of the organization. CRM systems often are used by organizations to customize and improve services provided to their customers and/or prospective customers.

CRM systems track a variety of activities that effect customer relationships either directly or indirectly. CRM systems often track direct interactions with customers (e.g., face to face meetings, phone calls, e-mail, etc.) or indirect interactions with customers (e.g., billing, planning, marketing, advertising, manufacturing, etc.). Information retrieved from CRM systems often is used to plan marketing campaigns, implement business strategies, and/or evaluate the success of CRM activities.

Individual customer representatives of an organization often interact with a variety of employees of their business partners in different roles. For example, a purchasing manager at a customer may interact with a sales representative of a supplier once per month on a face to face basis, but may interact with a customer service representative of the supplier via a telephone on a weekly or daily basis. This information can be tracked through the use of a CRM system.

SUMMARY

In one general aspect, the present invention is directed to computer-based apparatuses and methods for determining a relationship rank between a first party and a second party. According to various embodiments, the method may comprise various steps performed by a computer system. A contact interaction score for the first party relative to the second party may be calculated by the computer system. The contact interaction score may be calculated using data for the first party and the second party stored in a contact interaction database. The contact interaction database may store data indicative of contact interactions.

A telephone call score for the first party relative to the second party may also be calculated by the computer system. The telephone call score for the first party may be calculated using data for the first party and the second party stored in a telephone call tracking database. The telephone call tracking database may store data indicative of telephone calls between the first party and the second party.

In addition, an e-mail score for the first party relative to the second party may be calculated by the computer system. The e-mail score for the first party may be calculated using data for the first party and the second party stored in an e-mail database. The e-mail database may store data indicative e-mails between the first party and the second party.

A relationship score for the first party relative to the second party may be calculated by the computer system based on a weighted sum of at least the telephone call score and the e-mail score. A relationship rank for the first party relative to the second party also may be calculated.

The relationship rank may be calculated to determine the strength of the relationship between an individual employee of an organization and an individual employed by a client or prospective client of the organization. The relationship rank also may be calculated to determine the strength of the relationship between the organization and another organization, such as a client or prospective client. The relationship rank also may be calculated to determine the strength of the relationship between an individual employee of the organization and an organization. In addition, the relationship rank may be calculated to determine the strength of the relationship between an organization and an individual employed by another organization, or may be calculated to determine the strength of the relationship between two individuals not employed by the organization.

DESCRIPTION OF THE FIGURES

Embodiments of the present invention will be described by way of example in conjunction with the following figures, wherein.

DESCRIPTION

Computer-based apparatuses and methods for determining a relationship rank between two parties are disclosed herein. The parties may be both persons or both organizations. Alternatively, the first party may be an organization, and the second party may be an individual or vice versa. Determining the degree of rank between two parties may be important to an organization in determining a variety of customer service actions to be taken in the future, such as asking an employee of an organization with a strong relationship with a decision-maker at a customer and/or prospective customer to make an initial sales call to that decision maker. Various embodiments described herein may be particularly beneficial to businesses in helping to surface relationships between employees of the business and external contacts or to surface relationships between two external contacts.

Figure 1:
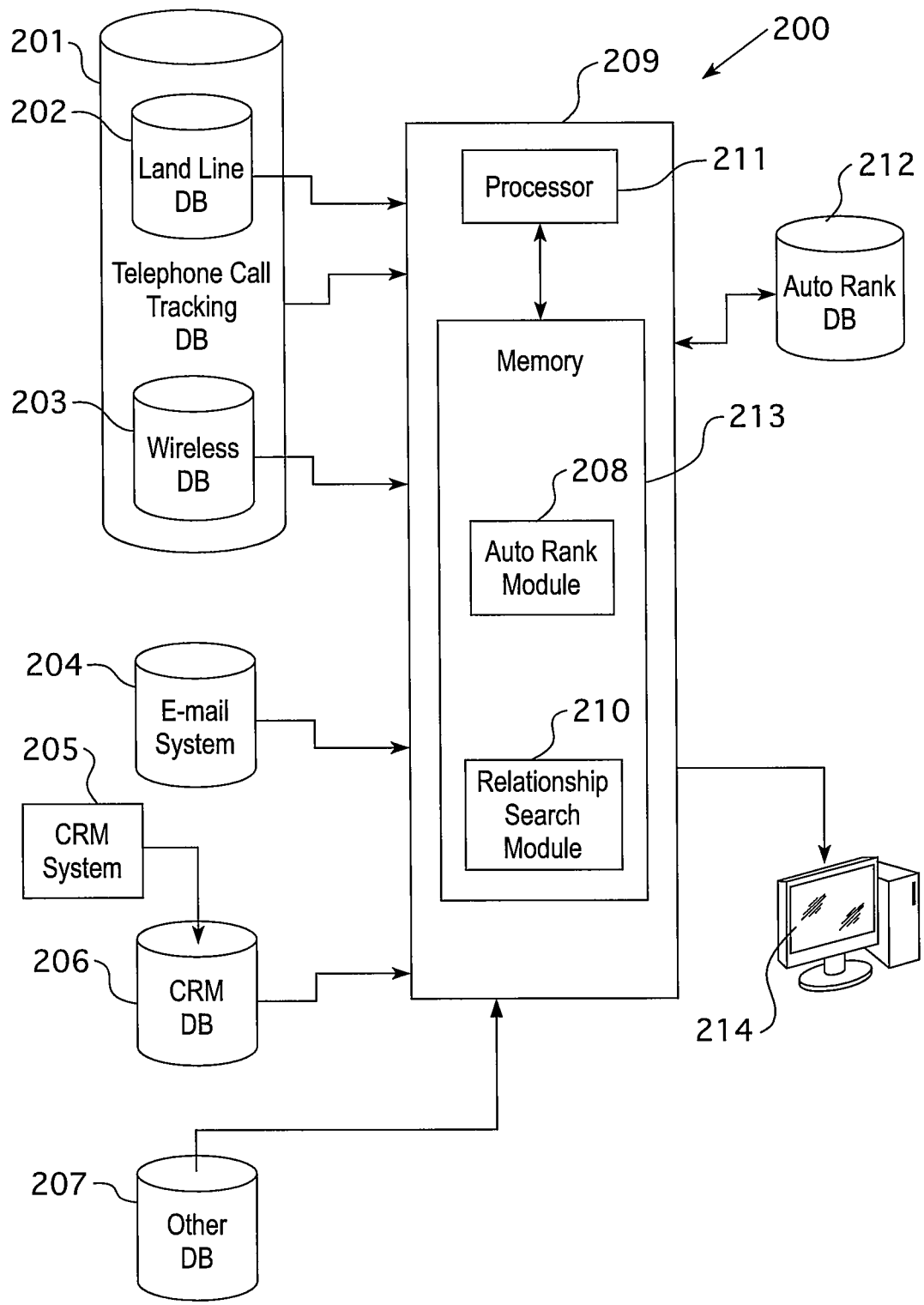
FIG. 1 is a diagram of a system according to various embodiments of the present invention.

In various embodiments, data from an organization (e.g., a business, non-profit entity, governmental agency, etc.) is used to determine the relationship scores and ranks between employees of or other people associated with the organization and employees of or other people associated with a client and/or prospective client. The data may be stored electronically in various computer databases. In one embodiment, the data for a given time frame (e.g., a year, a quarter, etc.) is used to determine the relationship scores and ranks. For example, relationship scores and ranks between employees of the organization and employees of a client and/or prospective client may be based upon contacts between the two parties over the course of the past five years or some other time period. A computer-based system 200 for calculating the relationship score and rank according to various embodiments of the present invention is shown in FIG. 1. Data regarding customer relationship management ("CRM") may be stored electronically in a computerized CRM database 206 or a contact interaction database. Data stored in the CRM database 206 may be indicative of the number of telephone calls between the first party and the second party, the number of face to face meetings between the first party and the second party, the number of social activities conducted involving or attended by both the first party and the second party, and/or any other suitable information regarding CRM. The first party, or any other suitable party, may log data into the CRM database 206 using the computer-based CRM system 205 or contact interaction system or any other suitable system. Such CRM systems 205 are known and are not further described herein. CRM data may be compiled, for example, using a survey regarding the number of telephone calls between the first party and the second party, the number of face to face meetings between the first party and the second party, the number of social activities conducted involving or attended by both the first party and the second party, and/or any other suitable information regarding CRM. The results of the survey may be entered by any suitable party into the CRM database 206 using the computer-based CRM system 205 or any other suitable system. Employees of the organization may complete the survey on-line, such as through an internal web-based application, for example, or they may complete hard copies of the survey by hand. In one embodiment, survey data may be automatically entered in the CRM database 206 using the CRM system 205, which may be a computer system that tracks CRM data. In one embodiment, surveys may be completed by an external contact regarding another external contact, and results of that survey may be transferred into the CRM database 206 using a third party feed or any other suitable method for transferring the data to the CRM database 206.

Data regarding telephone connections between various parties may be stored electronically in a computerized telephone call tracking database 201. The telephone call tracking database 201 may store data regarding phone calls involving employees of the organization, including the telephone number from which calls were placed, the telephone number to which the call was placed, the date and time of the telephone call, and the length of the telephone calls. The telephone tracking database 210 may store data regarding landline calls, cellular phone calls, private branch exchange (PBX) calls within an organization, direct phone communications between two individuals without any dialing required, or any other phone communications. In various embodiments, the telephone call tracking database 201 may comprise a landline database 202, a wireless database 203, and/or any other suitable database. The landline database 202 may store electronically data regarding landline calls made to or from employees of the organization. In addition to direct calls, the landline database 202 may include teleconferencing data to track the number of and the participants in telephone conferences, as well as the length of the teleconferences. The wireless database 203 may store electronically data regarding cellular calls to or from employees of the organization. This data may be entered into the telephone call tracking database 201 by employees of the organization or may be uploaded to the telephone call tracking database 201 automatically from databases of wireless service carriers.

In one embodiment, data regarding e-mail communication by employees of the organization may be recorded in a computerized e-mail database 204 for the organization. The e-mail database 204 may store electronically data indicating the e-mails sent from and to each e-mail account of the organization, and the recipient of each of those e-mails. External recipients/senders of e-mail may be discerned based on the domain name and the address of the recipient's/sender's e-mail address.

Various additional data may be tracked by the system 200 in at least one additional computer database 207, which stores data electronically. Data may be entered into the at least one additional database 207 by the employees of the organization or may be entered into the at least one additional database 207 automatically using a computer system which tracks any additional data. Data also may be entered into the at least one additional database 207 through direct third party feeds. This additional data may include, for example, data obtained from an electronic mailing label system which may track the production of electronic mail labels generated for mailings (e.g., greeting cards, calendars, publications, etc.) to persons outside of the organization from employees of the organization. That way, if needed, data regarding mailings between persons outside of the organization and employees of the organization may be used in the calculation of the relationship rank, although in various embodiments, such data may not be used for the calculations.

The system 200 of FIG. 1 may comprise one or a number of networked computer devices 209. For convenience, only one computer device 209 is shown in FIG. 7. The computer device 209 may comprise one or more processor circuits 211 in communication with one or more memory circuits 213. The processor(s) 211 may comprise a single core or multiple cores. Also, in one embodiment, the computer device 209 may comprise one processor 211, and in other embodiments, the computer device 209 may comprise two or more processors 211. The memory 213 may comprise RAM and/or ROM. For convenience, only one processor 211 and one memory 213 are shown in FIG. 1. The processor 211 and the memory 213 may be implemented as discrete integrated circuits (ICs), or they may be integrated in an IC.

The memory 213 may comprise an auto rank module 208 and/or a relationship search module 210. The auto rank module 208 and/or the relationship search module 210 may be implemented as software code to be executed by the processor 211 of the computing device 209 using any suitable computer language, such as, for example, Java, C, C++, Perl, Windows Presentation Foundation (WPF) graphical user interface (GUI), .NET, or Simple Object Access Protocol (SOAP) Hypertext Transfer Protocol (HTTP) using, for example, conventional or object-oriented techniques. The software code may be stored as a series of instructions or commands on a computer-readable medium, such as a random access memory (RAM), a read-only memory (ROM), a magnetic medium such as a hard drive or a floppy disk, or an optical medium such as a CD-ROM. The computing device 209 may be implemented as one or a number of networked computing devices, such as personal computers, laptops, mainframe computers, servers, workstations, or any other suitable computing devices. The computer device 209 may be in communication with the databases 201, 204, 206, 207 via one or more electronic data communication networks. The data communication networks may comprise a LAN or a WAN, for example. In addition, each database 201, 204, 206, 207 may have a computerized database management system for organizing and retrieving data from the databases.

Figure 2:
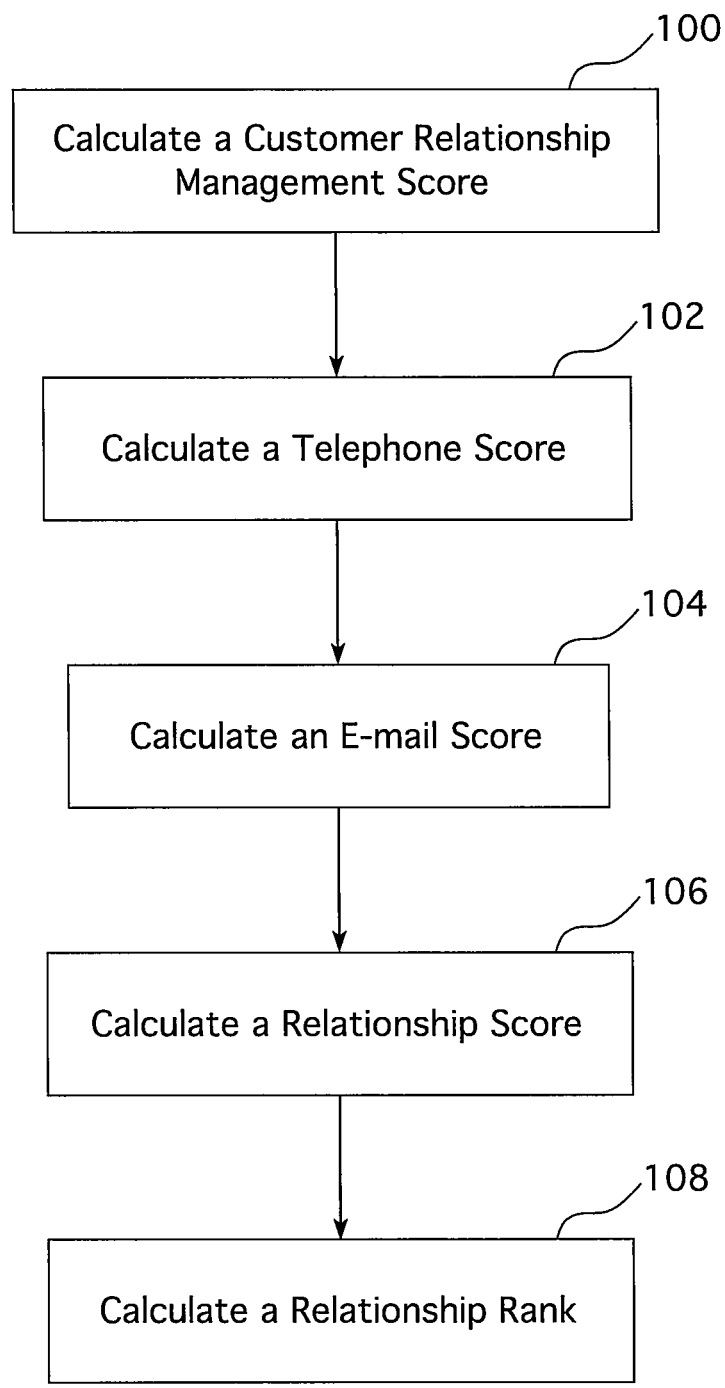
FIG. 2 is a diagram of a process according to various embodiments of the present invention.

FIG. 2 is a flowchart of a process that may be implemented by the computer system 200 to calculate the relationship rank/score according to various embodiments. The process starts at step 100, where the system 200 may calculate a CRM score or a contact interaction score for a first party (e.g., an employee of the organization) relative to a second party (e.g., an employee of a client or prospective client) using data stored in the CRM database 206. Data for a given time frame (e.g., a year, a quarter, etc.) may be used to determine the CRM score. For example, the CRM score between the first party and the second party may be based upon contacts between the two parties over the course of the past five years or some other time period. The CRM score may be calculated by the processor 211 by executing the auto rank module 208. The calculation of the CRM score may take into account: the number of telephone calls between the first party and the second party; the number of face to face meetings between the first party and the second party; and the number of social activities involving or attended by both the first party and the second party. Additional data stored in the CRM database 206, such as, for example, a number of other activities involving both the first party and the second party, may be taken into account when calculating the CRM score.

In one embodiment, the CRM score may be calculated using weighted values for the number of telephone calls between the first party and the second party, the number of face to face meetings between the first party and the second party, and the number of social activities involving the first party and the second party. According to various embodiments, the CRM score may be calculated using the following equation:

CRM Score=$A$*the number of telephone calls+$B$*the number of face to face meetings+$C$*the number of social activities+$D$*the number of other activities (e.g., the number of instant messages between the first party and the second party, electronic conferences involving both the first party and the second party, for example).

where A, B, C, and D represent the weighting factors for the various data. In one embodiment, A may equal 3.0, B may equal 4.0, C may equal 4.0, and D may equal 3.0.

At step 102, the system 200 may calculate a telephone score using data stored in the telephone call tracking database 201. Data for a given time frame (e.g., a year, a quarter, etc.) may be used to determine the telephone score. For example, the telephone score between the first party and the second party may be based upon telephone calls between the two parties over the course of the past five years or some other time period. The telephone score may be calculated by the processor 211 by executing the auto rank module 208. The calculation of the telephone score may take into account, according to various embodiments: the number of incoming telephone calls to the first party from the second party; and the number outgoing telephone calls from the first party to the second party. The system 200 may calculate the telephone score by determining the number of calls to/from the parties based on the telephone numbers involved in the call, which are stored in the telephone call tracking database 201. The incoming telephone calls and outgoing telephone calls may include landline calls, cellular phone calls, private branch exchange (PBX) calls within an organization, direct phone communications between two individuals without any dialing required, and any other suitable wireless and/or landline telephone calls. Data regarding wired and/or landline calls may be stored in the landline database 201 and/or the wireless database 202, respectively. Additional data stored in the telephone call tracking database 201 may be taken into account when calculating the telephone score.

In one embodiment, the telephone score may be calculated using weighted values for the number of incoming telephone calls to the first party from the second party and the number of outgoing telephone calls from the first party to the second party. According to various embodiments, the telephone score may be calculated using the following equation:

Telephone Score=$E$*the number of incoming telephone calls+$F$*the number of outgoing telephone calls where E and F represent the weighting factors of the various data. In one embodiment, E may equal 0.0 and F may equal 2.0.

In one embodiment, the process may continue at step 104, where the system 200 may calculate an e-mail score using data stored in the e-mail database 204. Data for a given time frame (e.g., a year, a quarter, etc.) may be used to determine the e-mail score. For example, the e-mail score between the first party and the second party may be based upon e-mails between the two parties over the course of the past five years or some other time period. The e-mail score may be calculated by the processor 211 executing the auto rank module 208. The calculation of the e-mail score may take into account the number of incoming e-mails to the first party (whether sent directly to the first party or where the first party is cc'd or bcc'd) from the second party, and/or the number outgoing e-mails from the first party to the second party (including whether directly to or cc'd or bcc'd). The system may calculate the e-mail score by determining the number of e-mails to/from the parties based on the e-mail addresses involved in the e-mail, which are stored in the e-mail database 204. In various embodiments, the incoming e-mails and outgoing e-mails may include electronic mail, instant messaging, and/or any other suitable wireless and/or wired forms of electronic communication where data regarding the communications are stored in the e-mail database 204 (and/or other suitable computer databases). Additional data stored in the e-mail database 204 may be taken into account when calculating the e-mail score.

In one embodiment, the e-mail score may be calculated using weighted values for the number of incoming e-mails to the first party from the second party and the number of outgoing e-mails from the first party to the second party. According to various embodiments, the e-mail score may be calculated using the following equation:

e-mail Score=$G$*the number of incoming e-mails+$H$*the number of outgoing e-mails where G and H represent the weighting factors of the various data. In one embodiment, G may equal 0.0 and H may equal 1.0.

At step 106, the system 200 may calculate the relationship score for the employees of the organization using the CRM score, the telephone score, and the e-mail score. The relationship score may be calculated by the processor 211 executing the auto rank module 208. According to various embodiments, the relationship score may comprise a weighted sum of the CRM score, the telephone score, and the e-mail score. In various embodiments, the scores may be evenly weighted, although in other embodiments, the various sub-scores may be weighted differently. Once the relationship score has been calculated, the relationship score may be stored electronically by the computer system 200 in the computerized auto rank database 212. In addition, the relationship score may be sent electronically and displayed on a computer device 214 that is in communication with the computer system 200 via a communication network (such as LAN or WAN). The computer device 214 may comprise a personal computer, a laptop, a smartphone, or any other suitable computer device.

At step 108, the system 200 may calculate a relationship rank based on the relationship score. The relationship rank may be an indication of the strength of the relationship between the first party and the second party. The relationship rank may be calculated by the processor 211 executing the auto rank module 208. The relationship rank may be based upon ranges, or buckets, of non-overlapping relationship scores. For example, a relationship score ranging from 0 to 6 may yield a relationship rank of 1, a relationship score ranging from 7 to 8 may yield a relationship rank of 2, a relationship score ranging from 9 to 11 may yield a relationship rank of 3, a relationship score of 11 to 23 may yield a relationship rank of 4, and a relationship score greater than 23 may yield a relationship rank of 5, with greater numbers for the rank indicating a strong relationship. Upon determining the relationship rank, the relationship rank may be stored in the auto rank database 212. The relationship rank may be displayed on the computer device 214.

In various embodiments, a user may request that the system 200 display at least a portion of the relationship data stored in the auto rank database 212. This back-end functionality may be provided by the relationship search module 210 of the system 200. The system 200 may allow a user to sort and search the relationship data stored in the auto rank database 212 using the relationship search module 210. A user may request data from the relationship search module 210 from the computer device 214 via a computer network. For example, the user may request relationship data for a particular employee of the organization, a particular client of the organization, the entire organization, or the entire client. Once a user has made a request for relationship data for a particular individual or individuals, this data may be calculated (if not calculated and stored previously), transmitted, and displayed on the computer device 214. The user may request that relationship ranks and/or relationship scores be organized by employees of the organization, clients and/or prospective clients of the organization, employees of clients and/or prospective clients, and/or any other suitable method for arranging relationship ranks and/or relationship scores.

The relationship search module 210 may search the relationship ranks and/or scores stored in the auto rank database 212 according to the request submitted by the user. The relationship search module 210 may receive data (e.g., relationship ranks and/or scores) from the auto rank database 212 based on the request and transmit the data to the computer device 214 for display. Once the relationship rank and/or score are displayed, the user may be able to adjust the search criteria using a screen display and the computer device 214. For example, as shown in the example screen shot of FIG. 3A, the relationship ranks between a particular employee of the organization and a number of employees of clients and/or prospective clients may be displayed based upon the particular employee's address book. The relationship ranks for the employee and each of the clients may be presented as a series of stars or other indicia on the display, ranked from weak to strong. The user, who may be the employee of the organization in this example, may be able to adjust the search criteria. This adjustment may be accomplished by the user selecting another search criteria such as the relationship score (not shown) from the display to display a numerical score, by possibly "clicking" on another search criteria with a computer mouse or any other suitable device, to display the relationship rank in a different format.

Figure 3A:
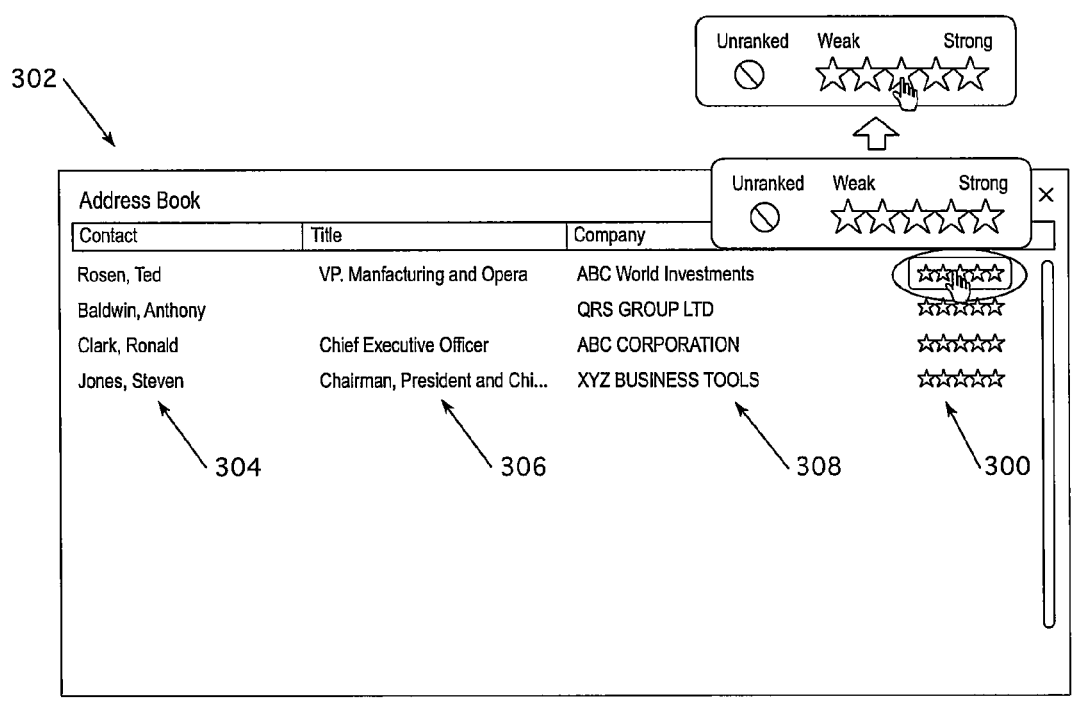
FIGS. 3A-5 are screen shots representing system outputs according to various embodiments of the present invention.

In various embodiments, as shown in FIG. 3A, the relationship rank and/or score 300 may be displayed according to an employee's address book 302, which may be stored in the CRM database 206 or any other suitable database 207. For that employee, the names 304, titles 306, company 308, relationship rank and/or score 300, and any other suitable information may be displayed. Contacts for the employee may be arranged alphabetically by name 304 (as shown in FIG. 3A), alphabetically by title 306 and/or company 308, strength of the relationship rank and/or score 300, or any other suitable manner for displaying relationship data. The user may be able to expand the information displayed or change the information displayed by the relationship search module 210 by selecting the item displayed, which may include "clicking" on the item displayed on the screen with a computer mouse or any other suitable device.

Figure 3B:
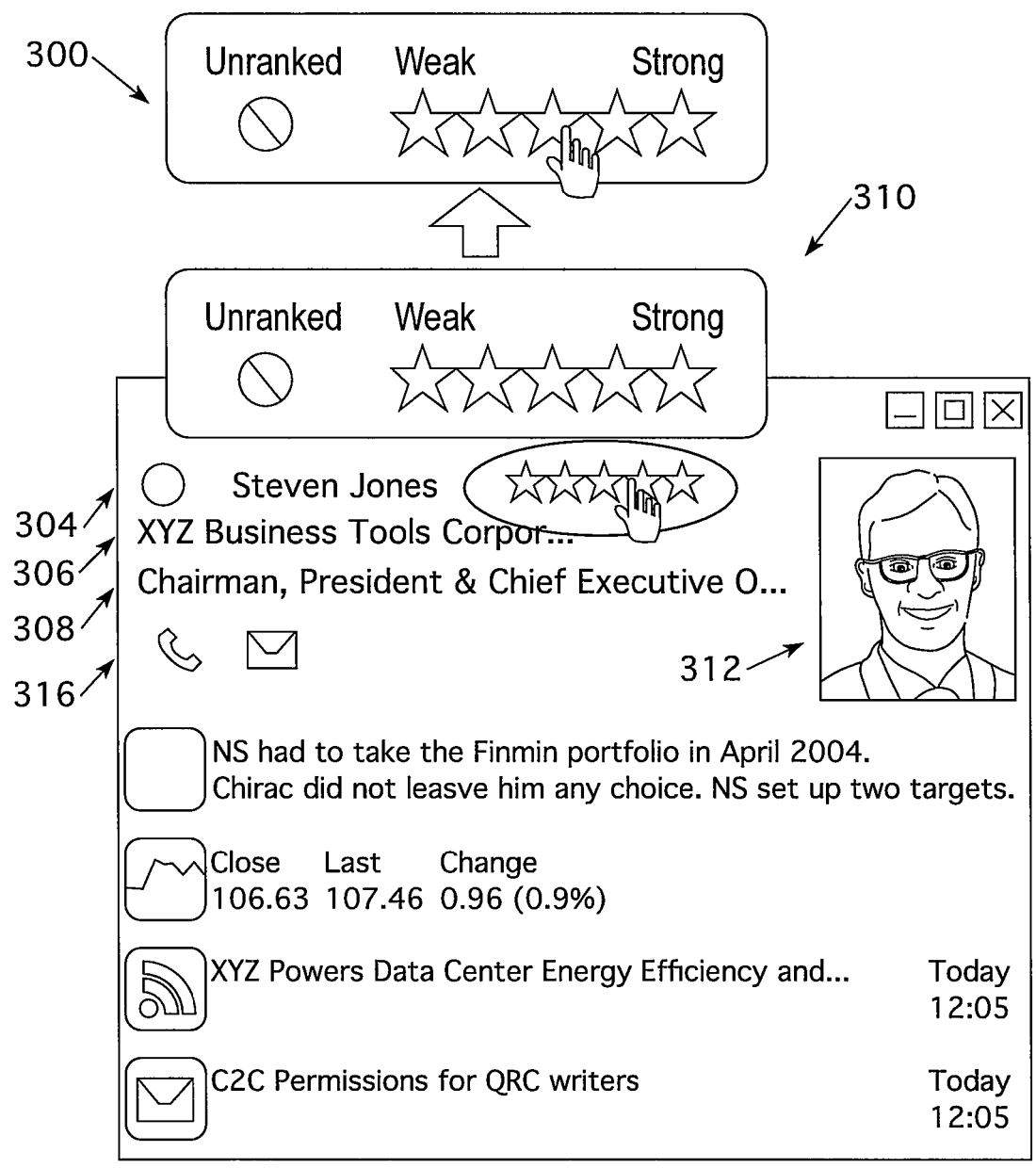

As shown in FIG. 3B, when the user selects a contact by name 304, the information about that contact may be expanded. The expanded view 310 of the contact information may display the contact's name 304, relationship rank and/or score 300, title 306 of the contact, company of the contact 308, picture of the contact 312, information 314 about the contact's company, various icons 316 that may be linked to the telephone call tracking database 201, the e-mail system 204, or any other suitable database, and/or any other suitable information.

Figure 4:
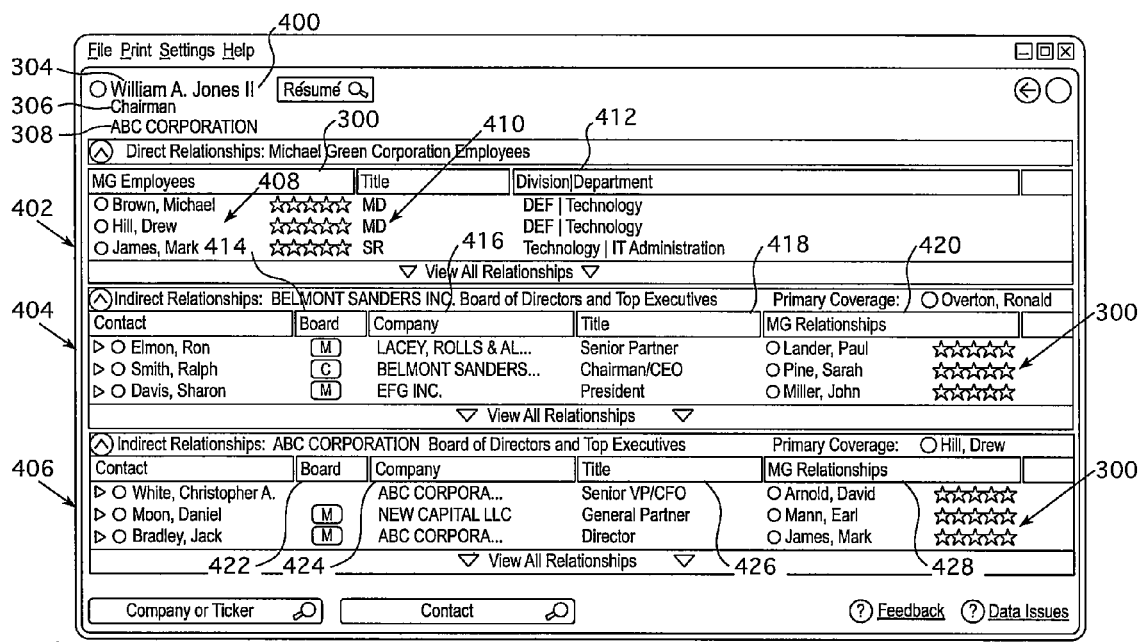

FIG. 4 is a screen display of one embodiment of the output of the relationship search module 210 displayed on the computer device 214. As shown in FIG. 4, the relationship data may be displayed for a particular client by that particular client's name 304. The particular client may have been selected from an employee's address book 302 as shown in FIG. 3A, for example. The user may be able to select the client/customer to be displayed by the relationship search module 210 by selecting the client from the address book 302, which may include "clicking" on the customer name 304 on the screen with a computer mouse or any other suitable device.

In various embodiments, as shown in FIG. 4, the relationship rank and/or score 300 may be displayed according to the name 304 and title 306 of a particular customer 400 of one of a number of companies 308. Relationship ranks and/or scores 300 between the particular customer 400 and other parties may be displayed. The relationship ranks and/or scores 300 may include relationship ranks and/or scores 300 between the customer 400 and (i) employees of the organization 402, (ii) employees of a subsidiary organization 404, (iii) persons associated with the customer and/or prospective customer 406, and/or (iv) any other suitable category. Relationships between the customer 400 and the employees of the organization 402 may be displayed according to the strength of the relationship rank and/or score 300 between the employees and the customer 400. Additional fields regarding employees of the organization 402 may include the employee's title 410, division/department 412, and/or any other suitable information.

In various embodiments, relationships between the customer 400 and the employees of subsidiary organizations 404 may be displayed according to the strength of the relationship rank and/or score 300 between the employees and the customer 400. Additional fields regarding employees of the subsidiary organization 404 may include the employee's board relationship 414, company 416, title 418, relationship with the customer and/or prospective customer 420, and/or any other suitable information. Relationships between the customer 400 and persons associated with the customer and/or prospective customer 406 may be displayed according to the strength of the relationship rank and/or score 300 between the customer 400 and the persons associated with the customer and/or prospective customer 406. Additional fields regarding persons associated with the customer and/or prospective customer 406 may include the person's board relationship 422, company 424, title 426, relationship with the customer and/or prospective customer 428, and/or any other suitable information.

Figure 5:
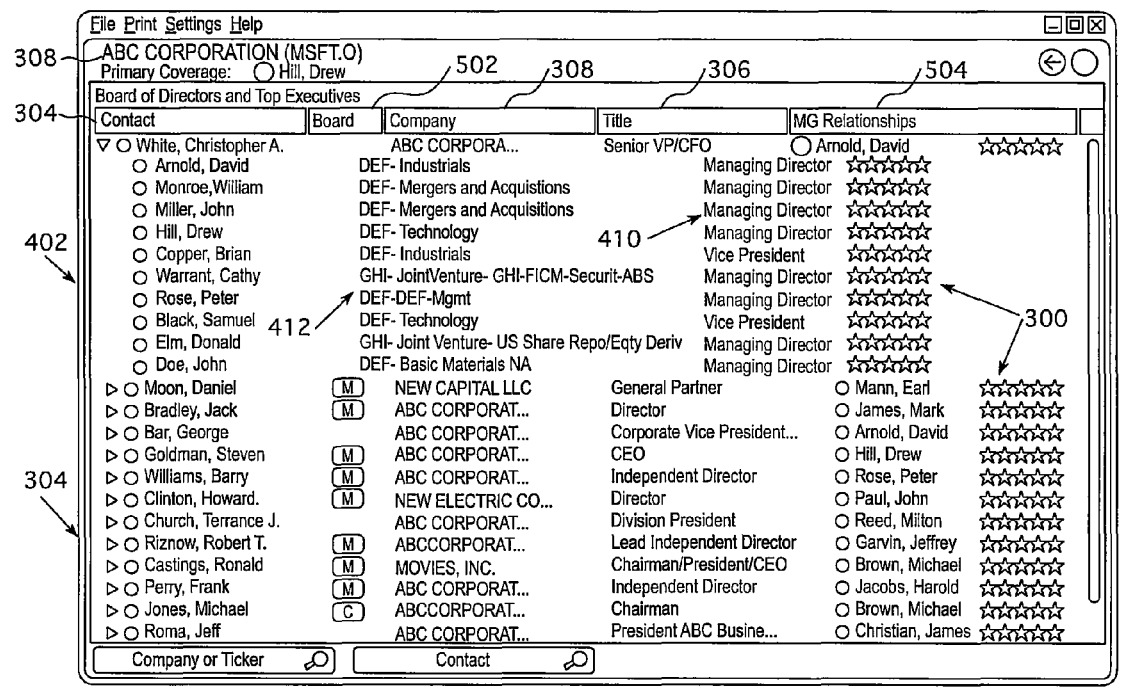

FIG. 5 is a screen display of one embodiment of the output of the relationship search module 210 displayed on the computer device 214. As shown in FIG. 5, the relationship rank and/or scores 300 between employees of the organization 504 and each customer name 304 for a particular customer 308. This may provide an overall view of the relationships between the organization and the client by displaying each individual relationship rank and/or score 300 between employees of the organization 504 and each individual customer name 304 at the client.

In various embodiments, as shown in FIG. 5, the relationship rank and/or score 300 may be displayed according to the company 308 name of customers and/or prospective customers. For each company 308 displayed, names 304 of employees of the company 308 may be displayed with the employee's board relationship 502, company 308, title 306, relationship with employees of the organization 504, relationship rank and/or score 300, and/or any other suitable information. Each relationship rank and/or score 300 displayed may represent the relationship rank and/or score 300 between the particular employee of the company 308 and the particular employee of the organization 504. For each name 304 displayed, the data displayed for that name 304 may be changed or expanded by selecting the name 304 displayed on the screen, which may include "clicking" on the name 304 with a computer mouse or any other suitable device. Once expanded, the data for the name 304 may include employees of the organization 402 (which may have a relationship with the name 304 displayed), division/department of the employee 412, title 410 of the employee, relationship rank and/or score 300, and any other suitable information.

The examples presented herein are intended to illustrate potential and specific implementations of the embodiments. It can be appreciated that the examples are intended primarily for purposes of illustration for those skilled in the art. No particular aspect or aspects' of the examples is/are intended to limit the scope of the described embodiments. The figures and descriptions of the embodiments have been simplified to illustrate elements that are relevant for a clear understanding of the embodiments, while eliminating, for purposes of clarity, other elements.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer system 200 may comprise one or more processors 211 in communication with memory 213 (e.g., RAM or ROM) via a data bus. The data bus may carry electrical signals between the processor(s) 211 and the memory 213. The processor 211 and the memory 213 may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method of determining and displaying a relationship rank between a first party and second parties, the method comprising:

calculating, by a host computer system, a telephone call score T for the first party relative to each of n second parties using data stored in a computerized telephone call tracking database that is in communication with the host computer system, wherein the telephone call tracking database stores data indicative of telephone calls between the first party and each of the n second parties, wherein the telephone tracking score for the first party relative to the nth second party is calculated based on the formula $T_n = aI_n + bO_n$, wherein $I_n$ represents the number of incoming telephone calls to the first party from the nth second party over a time period and $O_n$ represents the number of outgoing calls from the first party to the nth second party over the time period, where a and b are weighting factors, and wherein the host computer system comprises a processor circuit and a memory circuit;

calculating, by the host computer system, an e-mail score E for the first party relative to each of the n second parties using data stored in a computerized e-mail database that is in communication with the host computer system, wherein the e-mail database stores data indicative of e-mails between the first party and each of the n second parties, and wherein the email score for the first party relative to the nth second party is calculated based on the formula $E_n = cR_n + dS_n$, wherein $R_n$ represents the number of emails received by the first party from the nth second party over the time period and $S_n$ represents the number of emails sent by the first party to the nth second party over the time period, where c and d are weighting factors;

calculating, by the host computer system, a relationship score R for the first party relative to each of the n second parties based on a weighted sum of summands, wherein the summands comprise the telephone call score and the e-mail score, such that the relationship score for the first party relative to the nth second party is calculated based on the formula $R_n = eT_n + fE_n + C$, where e and f are weighing factors and C is zero or more other weighted summands;

calculating, by the host computer system, the relationship rank for the first party relative to each of the n second parties that is an indication of the first party's relationship strength to each of the n second parties, wherein the relationship rank is calculated based on the relationship score;

storing, by the host computer system, the relationship rank for the first party relative to each of the n second parties in a computerized auto rank database;

receiving, by the host computer system, a request to display the relationship rank of the first party relative to the n second parties that satisfy a search criterion, wherein the request is submitted by a user through a remote computer device that is in communication with the host computer system;

searching, by the host computer system, the auto rank database for the relationship rank of the first party relative to the n second parties that satisfy the search criterion;

sending, by the host computer system to the remote computer device, relationship rank data for the n' second parties that satisfy the search criterion;

displaying, by the remote computer device, a listing of the relationship rank of the first party relative to each of n' second parties that satisfy the search criterion on a display monitor of the remote computer device;

receiving, by the remote computer device, a request from the user for additional information for one of the n' second parties in the listing, wherein the user selects the one of the n' second parties from the listing of the n' second parties; and in response to receiving the request from the user for the additional information, displaying, by the remote computer device, additional information about the selected one of the n' second parties on the display monitor of the remote computer device.

2. The method of claim 1, further comprising calculating, by the computer system, a contact interaction score CRM for the first party relative to each of the n second parties using data stored in a contact interaction database that is in communication with the computer system, wherein the contact interaction database stores data indicative of contact interactions between the first party and each of the n second parties, and wherein the summands further comprise the contact interaction score, such that the relationship score for the first party relative to the nth second party is calculated based on the formula $R_n = eT_n + fE_n + gCRM_n + C$, where g is a weighing factor.

3. The method of claim 2, wherein the contact interaction database comprises a customer relationship management database.

4. The method of claim 2, wherein the contact interactions comprise telephone calls involving the first party and the n second parties.

5. The method of claim 2, wherein the contact interactions comprise face to face meetings involving the first party and the n second parties.

6. The method of claim 2, wherein the contact interactions comprise social activities involving the first party and the n second parties.

7. The method of claim 2, wherein the contact interactions comprise telephone calls involving the first party and the n second parties, face to face meetings involving the first party and the n second parties, and social activities involving the first party and the n second parties.

8. The method of claim 1, wherein the data indicative of telephone calls between the first party and the n second parties stored in the telephone call tracking database comprise data indicative of incoming telephone calls to the first party from the n second parties and data indicative of outgoing telephone calls from the first party to the n second parties.

9. The method of claim 1, wherein the data indicative of e-mails between the first party and the n second parties stored in a computerized e-mail database comprise data indicative of e-mails received by the first party from the n second parties and data indicative of e-mails sent from the first party to the n second parties.

10. The method of claim 2, wherein the contact interaction score for each of the n second parties is calculated based upon weighted values for the number of telephone calls, the number of face to face meetings, and the number of social activities involving both the first party and the second party over a time period.

11. The method of claim 10, wherein the contact interaction score for each of the n second parties equals the sum of (i) a first weighting factor times the number of telephone calls involving the first party and the second party over a time period, (ii) a second weighting factor times the number of face to face meeting involving the first party and the second party over the time period, (iii) a third weighting factor times the number of social activities involving the first party and the second party over the time period, and (iv) a fourth weighting factor times a number of other activities involving the first party and the second party over the time period.

12. The method of claim 1, wherein the data stored in the telephone call tracking database includes data from landline phone calls, cellular phone calls, and direct phone line communications between the first party and the n second parties.

13. The method of claim 1, wherein there are multiple, different relationship ranks and each relationship rank corresponds to a range of non-overlapping relationship scores.

14. An apparatus for determining and displaying a relationship rank between a first party and n second parties, the apparatus comprising:
- a computerized telephone call tracking database, wherein the telephone call tracking database stores data indicative of telephone calls between the first party and each of the n second parties;
- a computerized e-mail database, wherein the e-mail database stores data indicative of e-mails between the first party and each of the n second parties;
- a remote computer device of a user;
- a host computer system that comprises one or more processor circuits and one or more memory circuit, wherein the host computer system is in communication via a data communication network with the telephone call tracking database and the e-mail database and the remote computer device, and wherein the one or more memory circuits of the host computer system store instructions which when executed by the one or more processor circuits causes the one or more processor circuits to:
  - calculate a telephone call score T for the first party relative to each of the n second parties using data stored in the telephone call tracking database, wherein the telephone tracking score for the first party relative to the nth second party is calculated based on the formula $T_n = aI_n + bO_n$, wherein $I_n$ represents the number of incoming telephone calls to the first party from the nth second party over a time period and $O_n$ represents the number of outgoing calls from the first party to the nth second party over the time period, where a and b are weighting factors;
  - calculate an e-mail score E for the first party relative to each of the n second parties using data stored in the e-mail database, wherein the email score for the first party relative to the nth second party is calculated based on the formula $E_n = cR_n + dS_n$, wherein $R_n$ represents the number of emails received by the first party from the nth second party over the time period and $S_n$ represents the number of emails sent by the first party to the nth second party over the time period, where c and d are weighting factors;
  - calculate a relationship score R for the first party relative to each of the n second parties based on a weighted sum of summands, wherein the summands comprise the telephone call score and the e-mail score, such that the relationship score for the first party relative to the nth second party is calculated based on the formula $R_n = eT_n + fE_n + C$, where e and f are weighing factors and C is zero or more other weighted summands;
  - calculate the relationship rank for the first party relative to each of the n second parties that is an indication of the first party's relationship strength to the second party, wherein the relationship rank is based on the relationship score;
  - store the relationship rank for the first party relative to each of the n second parties in an auto rank database;
  - receive a request, from the remote computer device, to display the relationship rank of the first party relative to the n second parties that satisfy a search criterion of the user, wherein the remote computer device has a display monitor;
  - search the auto rank database for the relationship rank of the first party relative to the n second parties that satisfy the search criterion; and
  - send relationship rank data for the n' second parties that satisfy the search criterion to the remote computer device, and
- wherein the remote computer device is for:
  - displaying a listing the relationship rank of the first party relative to each of the n' second parties that satisfy the search criterion on the display monitor;
  - receiving a request from the user for additional information for one of the n' second parties in the listing, wherein the user selects the one of the n' second parties from the listing of the n' second parties; and
  - in response to receiving the request from the user for the additional information, displaying additional information about the selected one of the n' second parties on the display monitor.

15. The apparatus of claim 14, further comprising:
- a computerized contact interaction database, wherein the contact interaction database stores data indicative of contact interactions between the first party and each of the n second parties, wherein the one or more memory circuits further store instructions which when executed by the one or more processor circuits causes the one or more processor circuits to:
  - calculate a contact interaction score CRM for the first party relative to each of the n second parties using data stored in the contact interaction database, and wherein the summands further comprise the contact interaction score, such that the relationship score for the first party relative to the nth second party is calculated based on the formula $R_n = eT_n + fE_n + gCRM_n + C$, where g is a weighing factor.

16. The apparatus of claim 15, wherein the contact interaction database comprises a customer relationship management database.

17. The apparatus of claim 15, wherein the contact interactions comprise telephone calls involving the first party and the n second parties.

18. The apparatus of claim 15, wherein the contact interactions comprise face to face meetings involving the first party and the n second parties.

19. The apparatus of claim 15, wherein the contact interactions comprise social activities involving the first party and the n second parties.

20. The apparatus of claim 15, wherein the contact interactions comprise telephone calls involving the first party and the n second parties, face to face meetings involving the first party and the n second parties, and social activities involving the first party and the n second parties.

21. The apparatus of claim 14, wherein the data indicative of telephone calls between the first party and the n second parties stored in the telephone call tracking database comprise data indicative of incoming telephone calls to the first party from the n second parties and data indicative of outgoing telephone calls from the first party to the n second parties.

22. The apparatus of claim 14, wherein the data indicative of e-mails between the first party and the second party stored in the computerized e-mail database comprise data indicative of e-mails received by the first party from the second party and data indicative of e-mails sent from the first party to the second party.

23. The apparatus of claim 15, wherein the contact interaction score for each of the n second parties is calculated based upon weighted values for the number of telephone calls, face to face meetings, and social activities involving the first party and the second party over a time period.

24. The apparatus of claim 23, wherein the contact interaction score for each of the n second parties equals the sum of (i) a first weighting factor times the number of telephone calls, involving the first party and the second party over a time period (ii) a second weighting factor times the number of face to face meetings, involving the first party and the second party over the time period (iii) a third weighting factor times the number of social activities, involving the first party and the second party over the time period and (iv) a fourth weighting factor times a number of other activities involving the first party and the second party over the time period.

* * * * *